(12) United States Patent
Hirota

(10) Patent No.: US 10,042,213 B2
(45) Date of Patent: Aug. 7, 2018

(54) DISPLAY DEVICE INCLUDING PROJECTIONS OPPOSED TO EACH OTHER IN A SEALANT

(71) Applicant: Japan Display Inc., Minato-ku (JP)

(72) Inventor: Takenori Hirota, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/336,304

(22) Filed: Oct. 27, 2016

(65) Prior Publication Data

US 2017/0123247 A1 May 4, 2017

(30) Foreign Application Priority Data

Oct. 30, 2015 (JP) .................................. 2015-213828

(51) Int. Cl.
| G06F 3/041 | (2006.01) |
| G02F 1/1343 | (2006.01) |
| G02F 1/1337 | (2006.01) |
| G02F 1/1339 | (2006.01) |

(52) U.S. Cl.
CPC .......... *G02F 1/1339* (2013.01); *G02F 1/1337* (2013.01); *G02F 1/13394* (2013.01); *G02F 2001/13396* (2013.01)

(58) Field of Classification Search
CPC .. G02F 1/1339; G02F 1/1337; G02F 1/13394; G02F 2001/13396
See application file for complete search history.

(56) References Cited

U.S. PATENT DOCUMENTS

| 8,111,362 | B2 * | 2/2012 | Yamazaki | G02F 1/1368 |
| | | | | 257/59 |
| 8,125,608 | B2 * | 2/2012 | Kotani | G02F 1/133711 |
| | | | | 349/122 |
| 8,368,864 | B2 * | 2/2013 | Nagami | G02F 1/1339 |
| | | | | 349/153 |
| 9,709,854 | B2 * | 7/2017 | Hirota | G02F 1/1339 |
| 2004/0090582 | A1 * | 5/2004 | Ikeda | G02F 1/133514 |
| | | | | 349/130 |
| 2014/0167053 | A1 | 6/2014 | Akiyoshi | |
| 2015/0346556 | A1 | 12/2015 | Hirota et al. | |
| 2016/0013218 | A1 | 1/2016 | Akiyoshi | |

FOREIGN PATENT DOCUMENTS

| JP | 10-206871 | 8/1998 |
| JP | 2009-25355 | 2/2009 |
| JP | 2014-119709 | 6/2014 |
| JP | 2015-225227 | 12/2015 |
| JP | 2016-24268 | 2/2016 |

* cited by examiner

*Primary Examiner* — Tracie Y Green
(74) *Attorney, Agent, or Firm* — Oblon, McClelland, Maier & Neustadt, L.L.P.

(57) ABSTRACT

According to one embodiment, a display device includes a sealant and liquid crystal sealed between a first substrate and a second substrate, and the display device includes a first projection formed either the first substrate or the second substrate and a first counterpart formed on the other substrate, wherein the sealant includes an alignment film, the first projection extends in the direction of extension of the sealant, the first projection and the first counterpart are opposed to each other, a gap is formed between the first projection and the first counterpart to locate the sealant, the first projection has a vertical dimension greater than that of the gap, and the first projection contacts the liquid crystal and overlaps an inner edge of the sealant in a plan view.

12 Claims, 11 Drawing Sheets

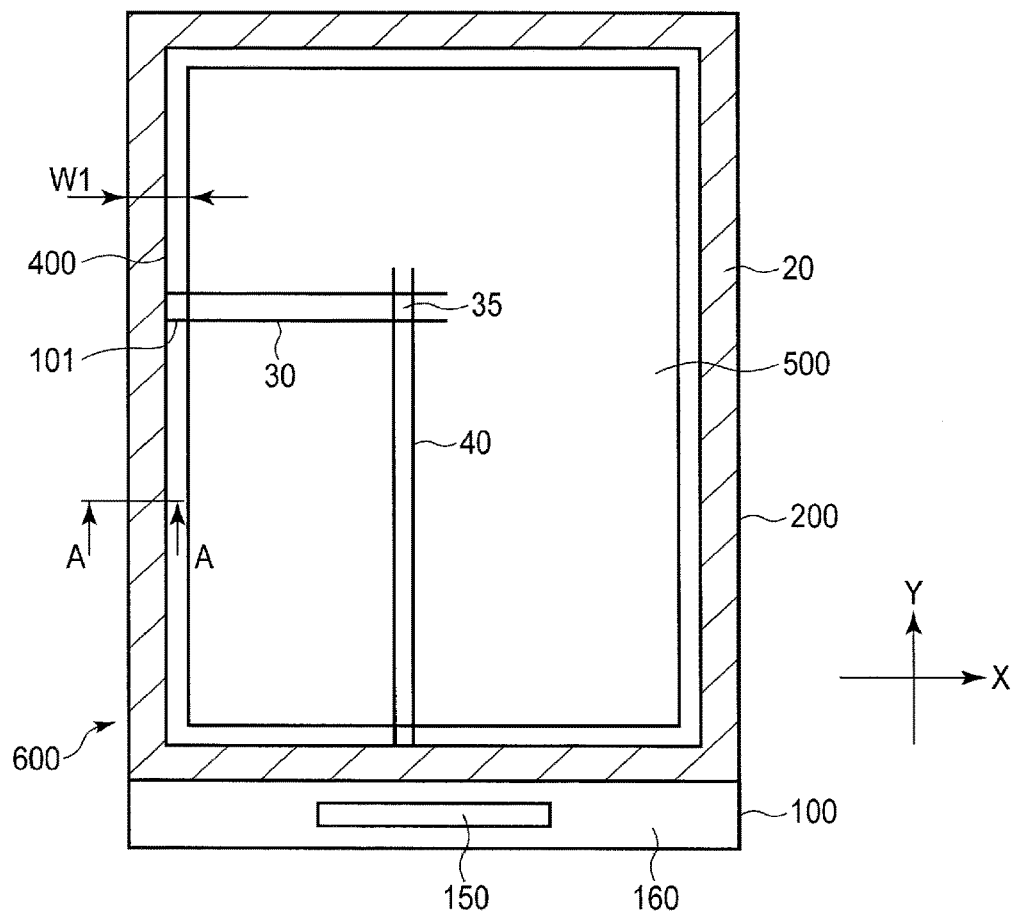
F I G. 1

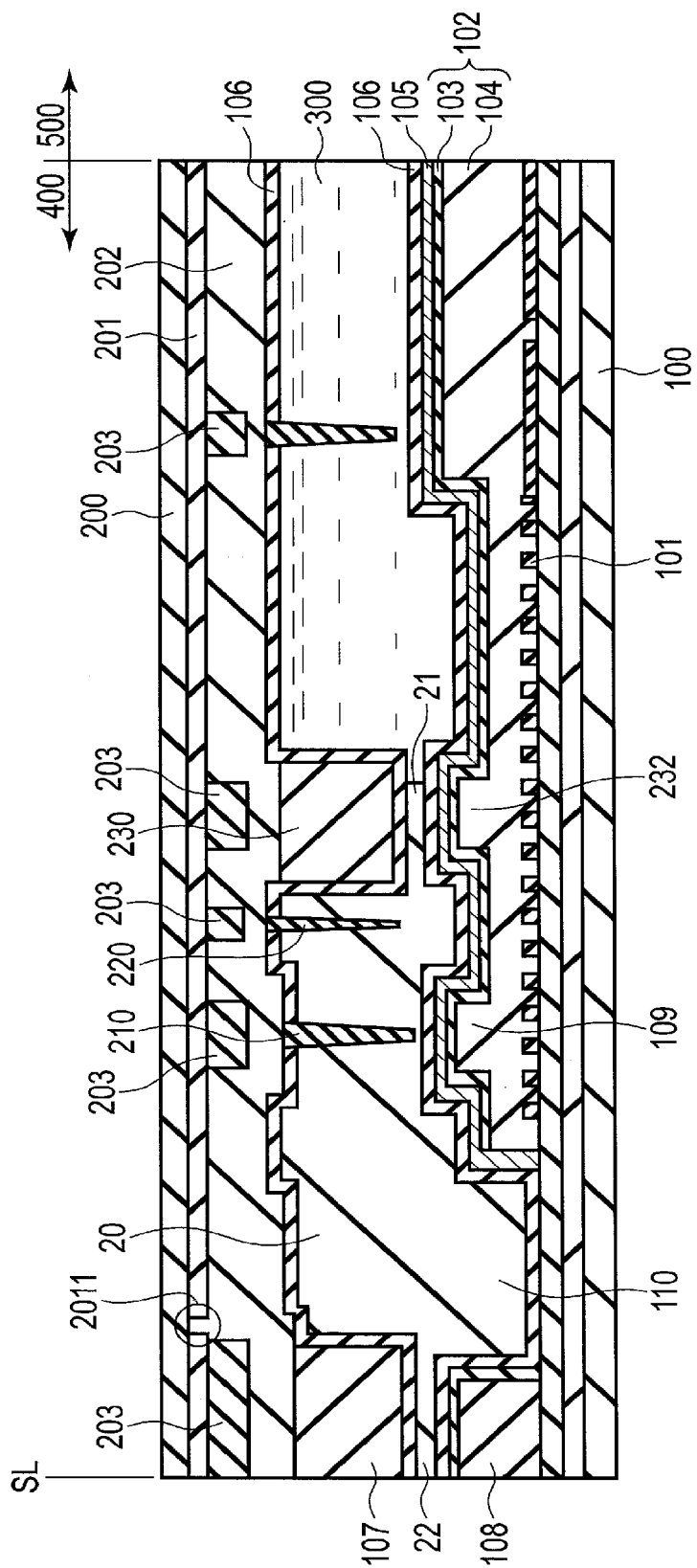
F I G. 2

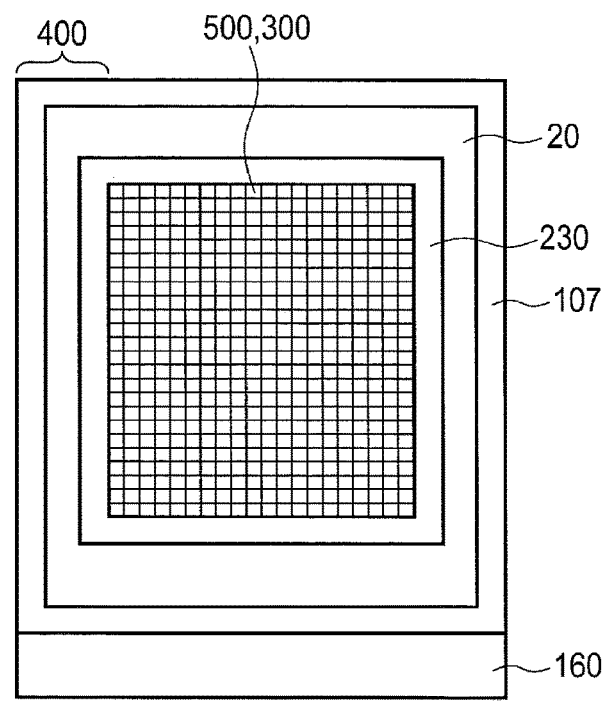
F I G. 7
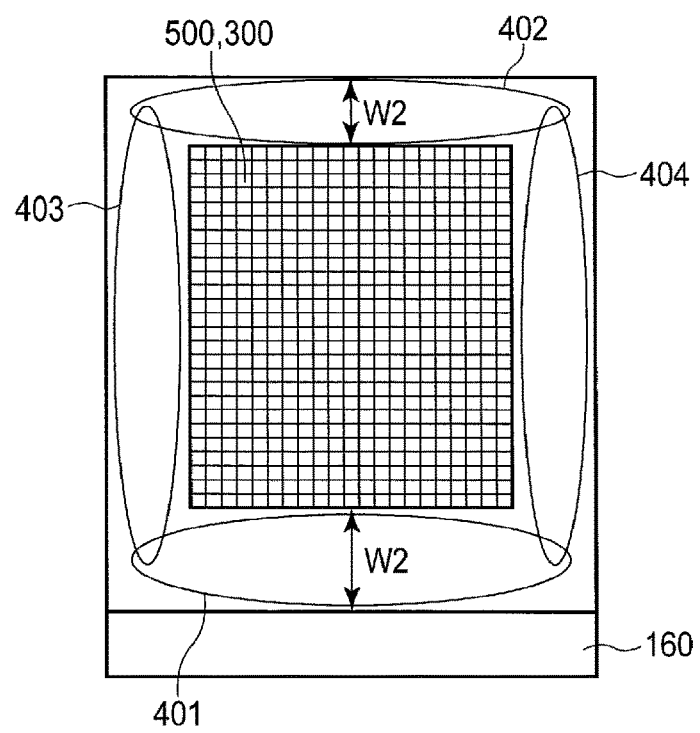
F I G. 8

DISPLAY DEVICE INCLUDING PROJECTIONS OPPOSED TO EACH OTHER IN A SEALANT

CROSS-REFERENCE TO RELATED APPLICATIONS

This application is based upon and claims the benefit of priority from Japanese Patent Application No. 2015-213828, filed Oct. 30, 2015, the entire contents of which are incorporated herein by reference.

FIELD

Embodiments described herein relate generally to a display device including two projections opposed to each other in a sealant.

BACKGROUND

Liquid crystal display devices include, for example, a first substrate on which a plurality of pixels including a pixel electrode, thin-film transistor (TFT), and the like are formed, and a second substrate disposed to be opposed to the first substrate. The first substrate and the second substrate are adhered by a sealant and liquid crystal is sealed therein. Such display devices control the alignment direction of liquid crystal molecules with voltage and change transmissivity of light incident on each pixel to form an image thereon.

As currently being demanded in this technical field, a peripheral area in which drive circuits of pixels are formed is made smaller and a display area is made greater. That is, the width between the edge of the display area and the edge of the liquid crystal display device (the width of the peripheral area) is narrowed. Such a structure is referred to as a thin bezel and is used in various products.

There are some problems when the thin bezel structure is adopted, and to solve the problems, there is a technique of providing a plurality of projections in the direction of extension of the sealant in a seal area. For example, thin bezel display devices include an alignment film area which is used for the alignment of liquid crystal molecules and a seal area, and these areas overlap with each other. Moisture tends to enter the internal structure through an interface between the alignment film and the other member, and the liquid crystal molecules may be deteriorated by the moisture. As a technique to solve such a problem, a projection structure is known. Furthermore, thin bezel display devices include the seal area and the display area close to each other. When the sealant is cured, gas is generated and may cause deformation of the sealant. In such a case, the deformed sealant may enter the internal structure of the display area because of the close gap between the seal area and the display area. As a technique to deal with this problem, a projection structure is known.

BRIEF DESCRIPTION OF THE DRAWINGS

FIG. 1 is a plan view showing a liquid crystal display device of a first embodiment.

FIG. 2 is a cross-sectional view of the liquid crystal display device of the first embodiment along line A-A of FIG. 1.

FIG. 7 is a plan view showing a liquid crystal display device of a fourth embodiment.

FIG. 8 is a plan view showing the liquid crystal display device of the fourth embodiment, in which the peripheral areas are focused.

DETAILED DESCRIPTION

Figure 3:
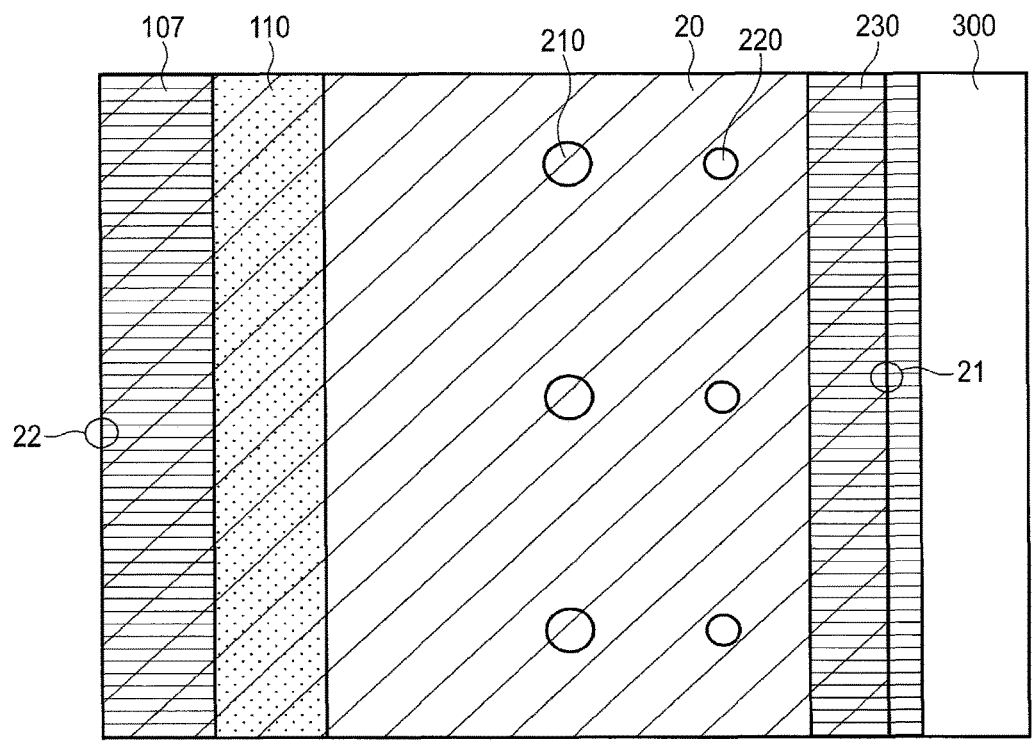
FIG. 3 is a plan view showing a sealant in an enlargement manner.

In general, according to one embodiment, a display device includes a first substrate, second substrate, display area on which an image is displayed, peripheral area disposed outside the display area in a plan view, sealant adhering the first substrate and the second substrate, which is provided with the peripheral area, and liquid crystal sealed between the first substrate and the second substrate by the sealant. The display device includes an alignment film formed on a surface of the first substrate or the second substrate to contact the liquid crystal and a first projection and a first counterpart formed on either the first substrate or the second substrate, wherein the sealant has an outer edge and an inner edge in the width direction crossing the direction of extension thereof, the first projection extends in the direction of extension of the sealant, the first projection and the first counterpart are opposed to each other, a gap is formed between the first projection and the first counterpart to locate the sealant, the first projection has a vertical dimension greater than that of the gap, and the first projection contacts the liquid crystal and overlaps the inner edge in a plan view.

According to one embodiment, a display device includes a first substrate, second substrate, display area on which an image is displayed, peripheral area disposed outside the display area in a plan view, sealant adhering the first substrate and the second substrate, which is provided with the peripheral area, and liquid crystal sealed between the first substrate and the second substrate by the sealant. The display device includes an alignment film formed on the surface of the first substrate or the second substrate to contact the liquid crystal, a first projection formed on either the first substrate or the second substrate, and a second projection formed on the other substrate, wherein the sealant has an outer edge and an inner edge in the width direction crossing the direction of extension thereof, the first projection and the second projection extend in the direction of extension of the sealant, the first projection and the second projection are opposed to each other, a gap is formed between the first projection and the second projection to locate the sealant, and the first projection contacts the liquid crystal and overlaps the inner edge in a plan view.

Hereinafter, the liquid crystal display device of the present application will be explained in embodiments.

Embodiments will be described with reference to the accompanying drawings. Note that the following embodiments of the present application do not limit the scope of the invention and can be achieved in various forms. Throughout the application and drawings, the same elements will be referred to by the same reference numbers and their detailed description will be omitted. The ordinal numbers (such as first and second) added to some elements are simply for the sake of easier interpretation and they do not limit the elements unless otherwise specified.

In the present application, if an element or an area is described as above (or below) any other element or area, it does not necessarily mean that such an element or an area is immediately above (or below) the other element or area, and it may mean that such an element or an area is positioned above (or below) the other element or area with some other element or area interposed therebetween.

A display device 600 includes a first substrate 100 and a second substrate 200. The first substrate 100 and the second substrate 200 each include at least one flat main surface such that the main surfaces thereof face each other with a certain gap therebetween. In the following description, the second substrate 200 is disposed above or in the upper side of the first substrate 100 in a cross-sectional view, and thus, the first substrate 100 is disposed below or in the lower side of the second substrate 200 in a cross-sectional view. Furthermore, a direction going from the sealant 20 to the display area 500 (the direction from the edge to the center of the substrate) is referred to as inside and the opposite direction is referred to as outside.

Firstly, the display device of the first embodiment is explained with reference to FIG. 1.

FIG. 1 shows the structure of the display device of the first embodiment. Note that, in the present embodiment, the display device is a liquid crystal display device including liquid crystal.

FIG. 1 shows the display device 600 on an X-Y plan which is defined by a first direction X and a second direction Y crossing each other.

The display device 600 includes a transistor substrate and a counter substrate which is opposed to the transistor substrate. Hereinafter, the transistor substrate is referred to as the first substrate 100 and the counter substrate is referred to as the second substrate 200; however, no limitation is intended thereby. The first substrate 100 may be the counter substrate and the second substrate 200 may be the transistor substrate.

The display device 600 includes liquid crystal 300 held between the first substrate 100 and the second substrate 200. The first substrate 100 and the second substrate 200 are adhered by the sealant 20 in a peripheral area with a certain gap formed therebetween. The liquid crystal 300 is sealed in a space defined by the first substrate 100, the second substrate 200, and the sealant 20. The display device 600 includes a display area 500 on which an image is displayed inside an area surrounded by a light shielding film 201 in a plan view. A plurality of pixels 35 used for the image display are arranged in the display area 500. Note that, the shape of the display device 600 and/or the display area 500 is formed in a substantially rectangular shape in general; however, it may be formed in any other polygonal shape, or it may be formed such that its corners are rounded. Furthermore, the pixels 35 are arranged in an optional shape and are generally in a matrix in an ordinary display area 500.

The first substrate 100 includes, in the display area 500, a plurality of scan signal lines 30 extending in the first direction X and a plurality of image signal lines 40 extending in the second direction Y. Each pixel 35 is provided within an area defined by the scan signal lines 30 and the image signal line 40 crossing each other. Each pixel 35 includes a transistor controlled by the scan signal lines 30 and the image signal lines 40. Furthermore, each pixel 35 includes a pixel electrode which is electrically connected to the transistor. A common electrode which produces an electric field with the pixel electrodes is formed in at least one of the first substrate 100 and the second substrate 200, and overlaps the pixels 35 in a plan view.

Although the explanation of a specific drive method of the liquid crystal of the display device 600 is be omitted, a display mode which uses a vertical field produced orthoganally to the substrate main surface (X-Y plane), namely, twisted nematic (TN) mode, optically compensated bend (OCB) mode, and vertical aligned (VA) mode, for example, can be used. Furthermore, a display mode which uses an inclined field with respect to the substrate main surface, or an in-plane switching mode (IPS) which uses a horizontal field along the substrate main surface, or a fringe field switching (FFS) mode which is a kind of the IPS mode can be used to drive the display device 600.

The display device 600 may be structured as a transmissive panel which selectively passes the light from a backlight unit disposed in its rear surface side to display an image. Or, the display device 600 may be structured as a reflective panel which selectively reflects the external light incident on the display device 600 to display an image, or the display device 600 may be structured as a transflective panel which is a combination of the transmissive panel and the reflective panel.

The display device 600 includes a driver area 160 in the proximity of the edge of the first substrate 100. In FIG. 1, the first substrate 100 is formed to be greater than the second substrate 200 such that the area of the first substrate 100 which does not overlap the second substrate 200 becomes the driver area 160. The driver area 160 includes an IC driver 150 which drives the liquid crystal display device and a terminal used for connection with a flexible printed circuit which supplies power, image signals, scan signals, and the like to the liquid crystal display device.

In the embodiments, the display device 600 is formed to have a thin bezel, and thus, the peripheral area 400 outside the display area 500 has a narrowed width. In other words, a gap W1 between the edge of the display area 500 and the edge of the liquid crystal display device becomes narrow (to be 1 mm or less, for example). In such a structure, if the liquid crystal 300 in the proximity of the edge of the sealant is contaminated, the contamination may spread inside the display area 500.

(First Embodiment)

FIG. 2 is a cross-sectional view of the sealant and the peripheral area 400 of the first embodiment along line A-A of FIG. 1. In FIG. 2, scan signal drawing lines 101 are formed on the first substrate 100 which is formed of glass. In other words, the scan signal drawing lines 101 of FIG. 2 are cross-sections the scan signal drawing lines 101 extending from the driver area 160 in FIG. 1. Note that the first substrate 100 and the second substrate 200 are formed of an inorganic material such as glass or an organic material such as polyimide.

Above the scan signal drawing lines 101, an inorganic insulating layer 103 and an organic insulating layer 104 are formed as a first insulating layer 102. The organic insulating layer 104 is formed thicker than the inorganic insulating layer 103, and functions as a smoothing film. The organic insulating layer 104 is formed of a photosensitive organic material as a photoresist, and the inorganic insulating layer 103 is formed of an organic material such as silicon nitride or silicon oxide. As shown in FIG. 2, the first insulating layer 102 has concaves and convexes within the seal area because the organic insulating layer 104 is patterned. Note that the inorganic insulating layer 103 may be patterned to form concaves and convexes on the first insulating layer 102. Furthermore, the first insulating layer 102 may be formed as a monolayer.

A method of forming a concave/convex structure of the first insulating layer 102 is not limited specifically, and it may be performed through an etching process including dry etching and wet etching, or it may be performed through a resist process using a photosensitive resin. In the resist process, such a concave/convex structure may be formed through a single resist process or two resist processes. Furthermore, a half-tone mask may be used in the resist process.

A transparent conductive layer 105 such as indium tin oxide (ITO) is formed on the organic insulating layer 104 in the seal area. The transparent conductive layer 105 is, in general, formed through the same manufacturing process of and the same material used for the pixel electrodes or the common electrode. Note that the transparent conductive layer 105 may be formed of any other transparent conductive material such as indium zinc oxide (IZO).

The display device 600 includes an alignment film 106 above the first substrate 100 or below the second substrate 200, which contacts the liquid crystal 300. The alignment film defines the initial alignment of the liquid crystal molecules.

In the example of FIG. 2, the alignment film 106 is formed on the transparent conductive layer 105. The alignment film 106 is formed by applying a liquid material of the alignment film onto a base substance through a flexography or inkjet printing method and curing the material. Since the display device 600 is a thin bezel type and the peripheral area 400 thereof is narrowed, the alignment film 106 extends in the seal area of the sealant 20. However, the alignment film 106 tends to exert low adhesion to the inorganic insulating layer 103 and organic insulating layer 104. Thus, in the present embodiment, the transparent conductive layer 105 is formed between the alignment film 106 and the inorganic insulating layer 103 and organic insulating layer 104 to increase the adhesion thereof. Note that, in the example of FIG. 2, the alignment film 106 extends in the seal area of the sealant 20 and contacts thereto; however, the alignment film 106 may not be formed in the seal area.

Liquid crystal 300 is contaminated by moisture from the outside the sealant 20, and such moisture tends to enter through the alignment film 106 or through an interface between the alignment film 106 and any other material (in the example of FIG. 2, the sealant 20 and the transparent conductive layer 105). In consideration of this point, the first insulating layer 102 has a concave/convex structure in the present embodiment. Since the first insulating layer 102 includes multiple concave parts, convex parts, and flat parts on its surface, moisture does not easily enter the liquid crystal 300 through the alignment film 106. Furthermore, the such a concave/convex structure increases the contact area between the first substrate 100 and the sealant 20, and thus, the adhesion strength between the first substrate 100 and the sealant 20 increases.

Here, the material for the sealant 20 is, in general, ultraviolet cured resin. However, there is a possibility that various metal lines such as scan signal drawing lines 101, connection lines to the common electrode, and connection lines to touch detection electrodes are formed below the first insulating layer 102. Such metal lines do not pass ultraviolet light. Thus, if ultraviolet light is irradiated from the lower side of the first substrate 100, curing of the sealant 20 will be prevented.

Furthermore, as a method of sealing liquid crystal, an injection port method which forms an injection port in the sealant 20 and a one drop fill (ODF) method which does not form an injection port in the sealant 20 are known. In the ODF method, a frame is formed on one substrate by a seal material, and then a liquid crystal material is dropped inside the frame. Then, the other substrate is adhered to the substrate with the material-filled frame, and the seal material is cured. That is, in the ODF method, the liquid crystal material contacts the seal material in a liquid state and thus is easily contaminated by the seal material. Thus, the display device without an injection port (which is not manufactured through the ODF method) should include the first projection 230 as described later.

Thus, as in the example of FIG. 2, gaps between the lines are formed to overlap the sealant 20 such that ultraviolet light can be irradiated into the sealant 20 through the gaps. Thereby, curing of the sealant 20 can be performed effectively. Here, if each line is widened, sufficient curing of the sealant 20 by ultraviolet irradiation may be difficult even with such gaps. In that case, a plurality of opening patterns should be formed in each line to pass ultraviolet light.

The display device 600 includes, for a better thin bezel structure of the peripheral area 400, metal lines in the area of the first substrate 100 overlapping the first projection 230 in a plan view. In that case, the gaps between the metal lines, or the opening patterns formed on the metal lines should be formed to overlap the aforementioned area. As shown in FIG. 2, the aforementioned overlapping area includes a less sealant and may contact liquid crystal 300. Thus, sufficient ultraviolet irradiation is required to cure the sealant sufficiently in order to prevent possible contamination of the liquid crystal 300 by the sealant.

On the other hand, metal lines should be avoided in an area of the first substrate 100 overlapping a groove 110 in a plan view. Furthermore, metal lines should be avoided in an area of the first substrate 100 overlapping a third projection 107 in a plan view. As shown in FIG. 2, the area of the first substrate 100 overlapping the groove 110 includes a mass sealant and sufficient ultraviolet irradiation is required to fully cure the sealant. Furthermore, the area where the third projection 107 is formed includes a less sealant and contacts the outer air. Thus, sufficient ultraviolet irradiation is required to fully cure the sealant to prevent moisture contamination.

In FIG. 2, the light shielding film 201 is formed in the peripheral area 400 of the second substrate 200. The material for the light shielding is any organic or inorganic black material including metal. Note that the light shielding film 201 of the present embodiment is an organic material such as resin. In that case, a possible entrance of moisture is an internal passage or a surface of the resin. Thus, the light shielding film 201 is divided by a light shielding film groove 2011.

As with the first substrate 100, the alignment film 106 is formed below a second insulating layer 202 to reach the area where the sealant 20 is formed in the second substrate 200. The second insulating layer 202 has a function to protect color filters 203 and the light shielding film 201 and a function as a smoothing film used to eliminate the unevenness caused by such elements. The surface of the second insulating layer 202 is patterned to have concaves and convexes to repel the moisture as in the first insulating layer 102. Note that such a concave/convex structure may be formed by applying an insulating layer onto a part of a flat underlying insulating layer.

In the present embodiment, the second insulating layer 202 is formed of photosensitive resin (organic material) such as photoresist. However, no limitation is intended thereby. The material for the second insulating layer 202 may be any other organic material, or inorganic material, or hybrid of organic and inorganic materials. Note that the concave/convex structure of the second insulating layer 202 is formed through the same method used for the first insulating layer 102.

The display device 600 includes the first projection 230 in the sealant 20. Then, the first projection 230 is formed on either the first substrate 100 or the second substrate 200 to project toward the other substrate. Furthermore, the display device 600 further includes different structures such as a second projection 232, third projection 107, fourth projection 108, fifth projection 109, first spacer 210, and second spacer 220. Details thereof will be explained with reference to FIGS. 2 to 4.

FIG. 2 shows that the first projection 230 and the third projection 107 are formed on the second substrate 200 and the second projection 232 and the fourth projection 108 are formed on the first substrate 100. The first projection 230 is opposed to the second projection 232 and the third projection 107 is opposed to the fourth projection 108, and each projection extends in the direction of extension of the sealant 20.

Now, each projection will be explained in detail. FIG. 3 shows the proximity of the sealant 20 in a plan view in an enlargement manner. The sealant 20 hatched in the figure includes the first projection 230 and the third projection 107 which is positioned outside the first projection 230. The first projection 230 and the third projection 107 extend in the direction of extension of the sealant 20. The sealant 20 includes an inner edge 21 and an outer edge 22 in the width direction crossing the direction of extension of the sealant 20.

The first projection 230 is formed to overlap the inner edge 21 in a plan view and the third projection 107 is formed to overlap the outer edge 22 in a plan view. In addition, the first projection 230 extends far inward over the inner edge 21 to contact the liquid crystal 300. Note that, although this is not shows, the second projection 232 and the fourth projection 108 should extend in the direction of extension of the sealant 20. Furthermore, the second projection 232 should be formed to overlap the inner edge 21 in a plan view.

Such a projection structure can be used to prevent the contamination of the liquid crystal 300 as described later. Furthermore, since the area of contact between the structures formed on the first substrate 100 or the second substrate 200 and the sealant 20 increases, the adhesion strength between the substrates and the sealant 20 increases. Furthermore, as described later, the groove 110 increases the area of contact between the first substrate 100 or the second substrate 200 and the sealant 20.

Note that, in the example of FIG. 3, the inner edge 21 of the sealant 20 extends straight to be parallel with the first projection 230. However, the sealant before a curing process is in a liquid state, and the inner edge 21 is partly bent or zigzagged. In that case, some part of the first projection 230 may not overlap the inner edge of the sealant 20. However, even such a display device can be encompassed in the scope of the invention of the present application.

Figure 13:
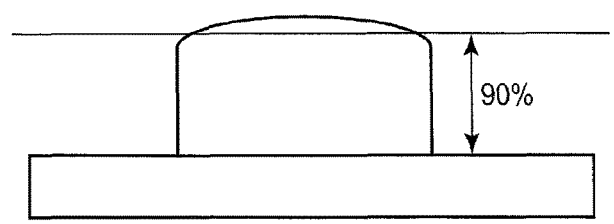
FIG. 13 is a cross-sectional view showing a top surface of a projection.
Figure 4:
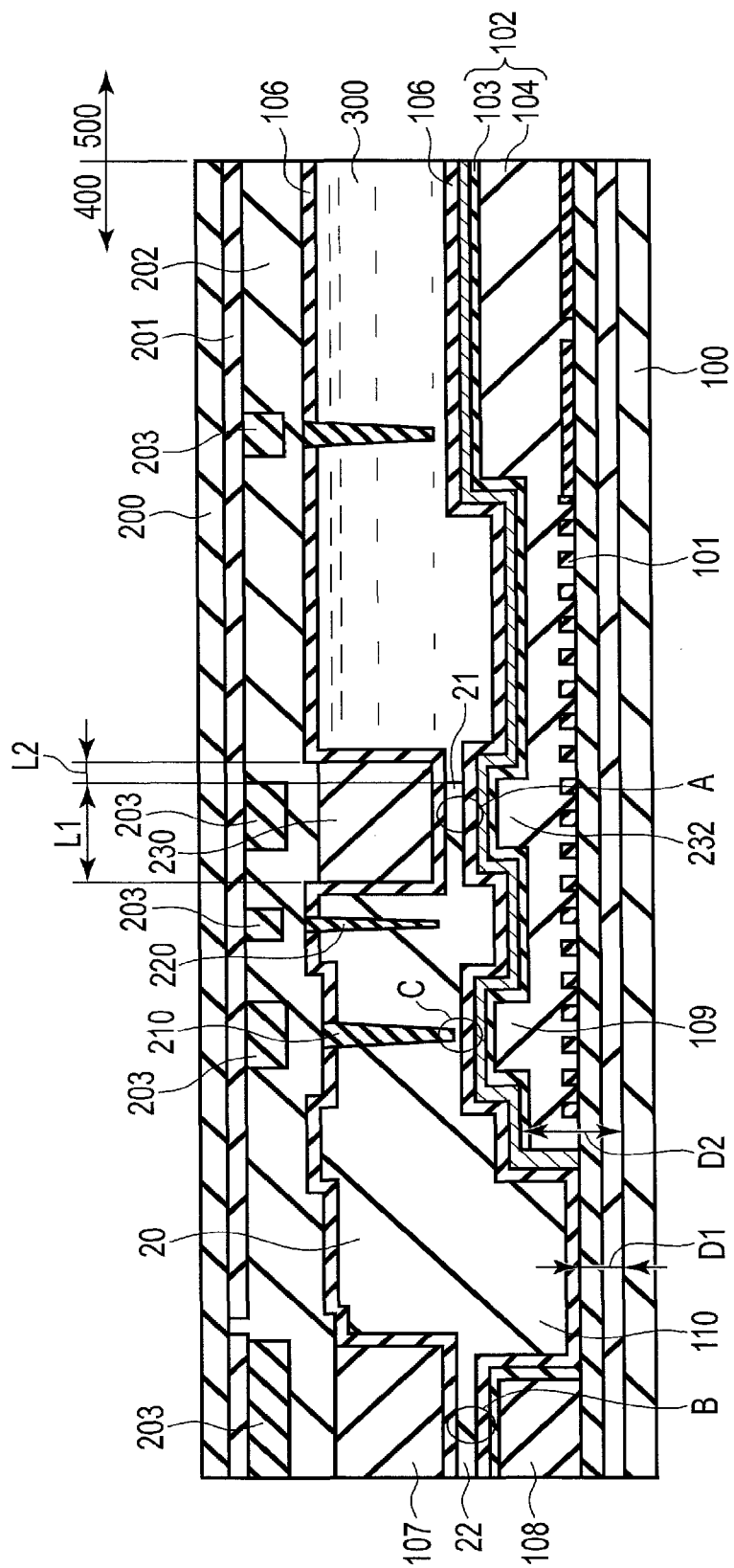
FIG. 4 is another cross sectional view of the liquid crystal display device of the first embodiment along line A-A of FIG. 1.

Furthermore, as shown in FIG. 4, a length L1 in which the top surface of the first projection 230 overlaps the sealant 20 is formed to be greater than a length L2 in which the top surface of the first projection 230 overlaps the liquid crystal 300. With such a relationship, the area of contact between the first projection 230 and the sealant 20 can be secured largely, and the adhesion strength can be increased. Note that, the top surface corresponds to the top 10% portion of the projection as defined by the line drawn at the 90% position from the bottom in FIG. 13.

The first spacer 210 and the second spacer 220 are formed below the second insulating layer 202. As shown in FIG. 3, the first spacer 210 and the second spacer 220 do not extend in the direction of extension of the sealant 20 and are each formed in a pillar shape. Such spacers are arranged in the direction of extension of the sealant 20 at regular intervals. The first spacer 210 defines a gap between the first substrate 100 and the second substrate 200. The second spacer 220 prevents an excessive decrease in the gap between the first substrate 100 and the second substrate 200 if a strong external force is applied to the second substrate 200.

In the display device 600, a base is formed between the substrates (100 and 200) in which the first projection 230, third projection 107, first spacer 210, and second spacer 220 are formed, and the base includes color filters 203.

Although this is not depicted, the color filters 203 formed at the base of the first projection 230 and the third projection 107 extend in the direction of extension of the sealant 20 as with the first projection 230 and the third projection 107.

In the display device 600, the second projection 232 is formed on the position of the substrate to be opposed to the first projection 230 formed on the other substrate. A gap A is formed between the first projection 230 and the first counterpart on the first substrate 100, and the sealant 20 extends inside gap A. Similarly, a second counterpart is formed on the position of the substrate to be opposed to the third projection 107 formed on the other substrate. A gap B is formed therebetween and the sealant 20 extends inside gap B. Furthermore, a third counter part is formed on the position of the substrate to be opposed to the first spacer 210 on the other substrate. A gap C is formed therebetween and the sealant 20 extends inside gap C. Each counterpart may be formed as a plane, projection, or groove. Note that, in FIG. 4, the first counterpart is the second projection 232, the second counterpart is the fourth projection 108, and the third counterpart is the fifth projection 109.

In FIG. 4, since the inner edge 21 of the sealant 20 is positioned inside gap A, the area of contact between the liquid crystal 300 and the sealant 20 is very small, and the sealant 20 in the proximity of the liquid crystal 300 is very low in volume. The material of the sealant and the impurity therein may possibly contaminate the liquid crystal 300; however, such a possibility of contamination of the liquid crystal 300 by the sealant can be suppressed by the aforementioned structure. Furthermore, gap A is defined by the first projection 230 and the second projection 232, that is, gap A is not defined by one excessively long and large projection, and thus, the structural stability of the projection can be increased. In that case, the vertical dimension of the first projection 230 should be set greater than the vertical dimension of gap A, and specifically, should be at least twice the vertical dimension of gap A. Furthermore, if the first counterpart is the second projection 232, the total vertical dimension of the first projection 230 and the second projection 232 should be set greater than the vertical dimension of gap A. Specifically, the total dimension should be at least twice the vertical dimension of gap A.

Furthermore, since the outer edge 22 of the sealant 20 is positioned inside gap B, the area of contact between the outside and the sealant 20 is small and the sealant 20 in the proximity of the outside is very low in volume. With this structure, moisture entering the sealant 20 can be suppressed, and thus, a possibility of contamination of the liquid crystal 300 can be suppressed. Furthermore, since gap B is defined by the first projection 230 and the second projection 232, the volume of the sealant 20 decreases, and thus, scribing of a motherboard, which will be described later, can be performed easily. Furthermore, gap B is not defined by one excessively long and large projection, and thus, the structural stability of the projection can be increased. Note that the third projection 107 and the fourth projection 108 should be formed to overlap the outer edge 22 in a plan view. Similarly, the total vertical dimension of the third projection 107 and the fourth projection 108 should be set greater than the vertical dimension of gap B, and specifically, should be at least twice the vertical dimension of gap B.

A method of forming each projection (230, 232, 107, 108, and 109) and each spacer (210 and 220) is not limited specifically, and it may be performed through an etching process including dry etching and wet etching, or it may be performed through a resist process using a photoresist material. Furthermore, a half-tone mask may be used in the resist process. Each projection and each spacer may be formed integrally with the first insulating layer 102 and the second insulating layer 202. Alternatively, each projection and each spacer may be formed separately from the first insulating layer 102 and the second insulating layer 202.

The main purpose of the first spacer 210 is to maintain a gap between the first substrate 100 and the second substrate 200. Thus, gap C is formed smaller than gap A and gap B.

The outer edge 22 of the sealant 20, end of the third projection 107, end of the first substrate 100, and end of the second substrate 200 are positioned to correspond to each other, and should be aligned straight in a cross-sectional view.

As shown in FIG. 2, when a display device is separated from a motherboard through a scribing process with reference to a scribing line SL, the ends of the aforementioned elements are aligned on the same plane (aligned straight in a cross-sectional view). In addition, if the third projection 107 is formed to overlap the outer edge 22 of the sealant 20 as shown in FIG. 2, the volume of the sealant in the proximity of the outer edge 22 can be reduced. Thus, a scribing process of the motherboard with reference to the scribing line SL can be facilitated.

The display device 600 may include a groove 110 in the first insulating layer 102 or the second insulating layer 202. Such a groove 110 should extend in the direction of extension of the sealant 20 as shown in FIG. 3. The groove 110 may be positioned outside the first projection 230 in a plan view, and specifically be positioned between the first projection 230 and the third projection 107.

In the groove 110, the first insulating layer 102 is formed extremely thin or is not formed at all. Thus, a gap between the bottom surface of the groove 110 and the surface of the substrate on which the groove 110 is formed is less than a gap between the other surface of the insulating layer in the seal area and the surface of the substrate on which the insulating layer is formed. Since the organic insulating layer 104 is formed of an organic material, it is highly water permeable. By dividing the organic insulating layer 104 with the groove 110, the moisture permeation in the liquid crystal 300 can be reduced. Furthermore, the groove 110 forms a concave/convex structure on the surface of the first insulating layer 102, and thus, the moisture permeation in the liquid crystal 300 through the alignment film 106 can be reduced.

Furthermore, with the concave/convex structure on the insulating layer, a gap D1 between the bottom surface of the groove 110 and the surface of the substrate is less than a gap D2 between the bottom surface of the concave part of the insulating layer and the surface of the substrate. For example, in the example of FIG. 4, gap D1 between the bottom surface of the groove 110 and the surface of the first substrate 100 is less than gap D2 between the bottom surface of the concave part and the surface of the first substrate 100.

(Second Embodiment)

Figure 5:
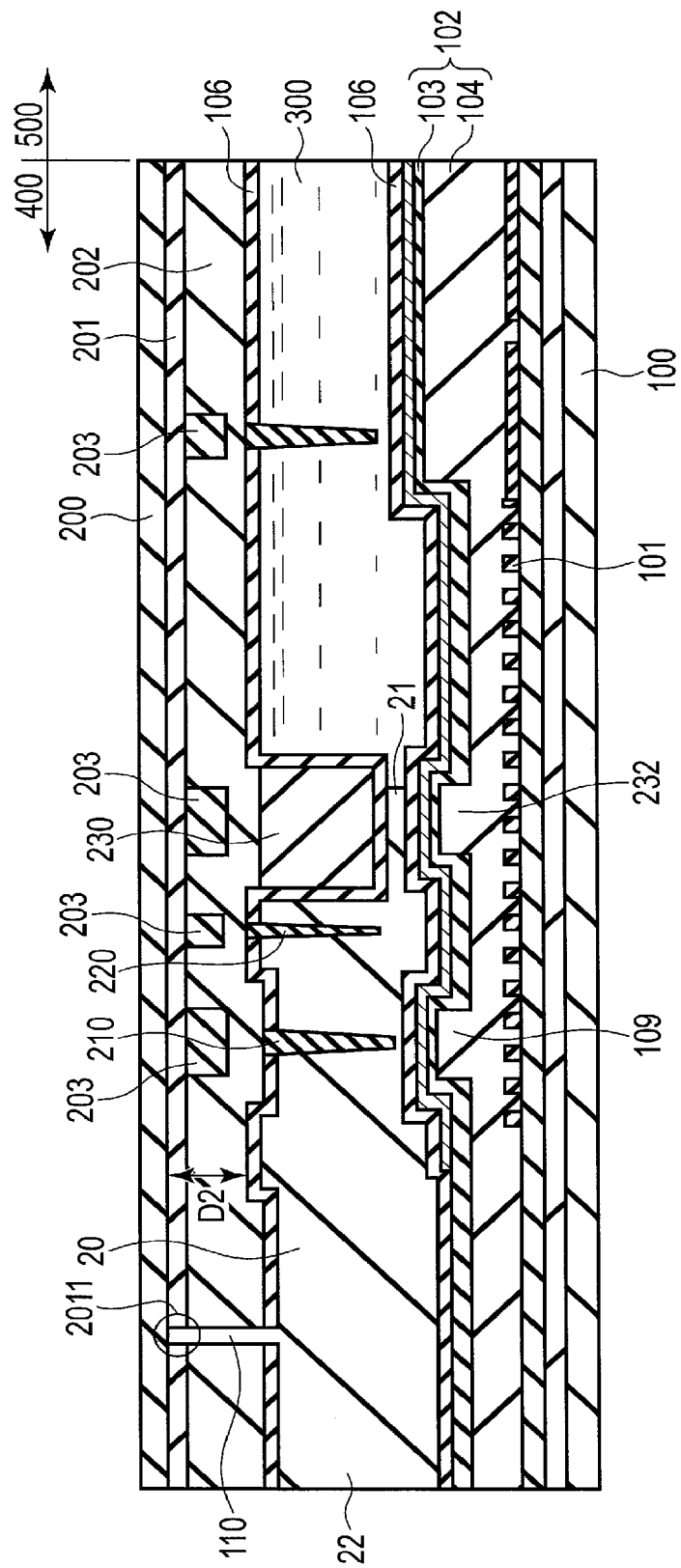
FIG. 5 is a cross-sectional view of a liquid crystal display device of a second embodiment which corresponds to the line A-A cross-section of FIG. 1.

FIG. 5 is a cross-sectional view showing a sealant 20 and a peripheral area 400 of the second embodiment, which corresponds to the line A-A cross-section of FIG. 1. The second embodiment will be explained in relation to the main commonality with and differences from the first embodiment.

In the example of FIG. 5, a first projection 230, second projection 232, first spacer 210, second spacer 200, and fifth projection 109 are formed as in the first embodiment. The first projection 230 contacts liquid crystal 300 as in the first embodiment. Furthermore, an alignment film 106 extends in the seal area, and the surfaces of first insulating layer 102 and second insulating layer 202 are both patterned to have a concave/convex pattern as in the first embodiment. The advantages achieved through the above structures are the same as in the first embodiment, and their detailed explanation is omitted.

On the other hand, the structure of the second embodiment differs from that of the first embodiment in the following respects. A third projection 107 and a fourth projection 108 are not formed. A groove 110 is formed in the second insulating layer 202 of the second substrate 200. Furthermore, the groove 110 communicates with a light shielding film groove 2011 formed in the light shielding film 201.

As shown in FIG. 5, gap D1 between the bottom surface of the groove 110 and the surface of the second substrate 200 is less than gap D2 between the bottom surface of the concave part of the second insulating layer 202 and the surface of the second substrate 200. Note that, in the example of FIG. 5, the bottom surface of the groove 110 is the surface of the second substrate 200, and thus, gap D1 is zero, which is omitted from the depiction.

(Third Embodiment)

Figure 6:
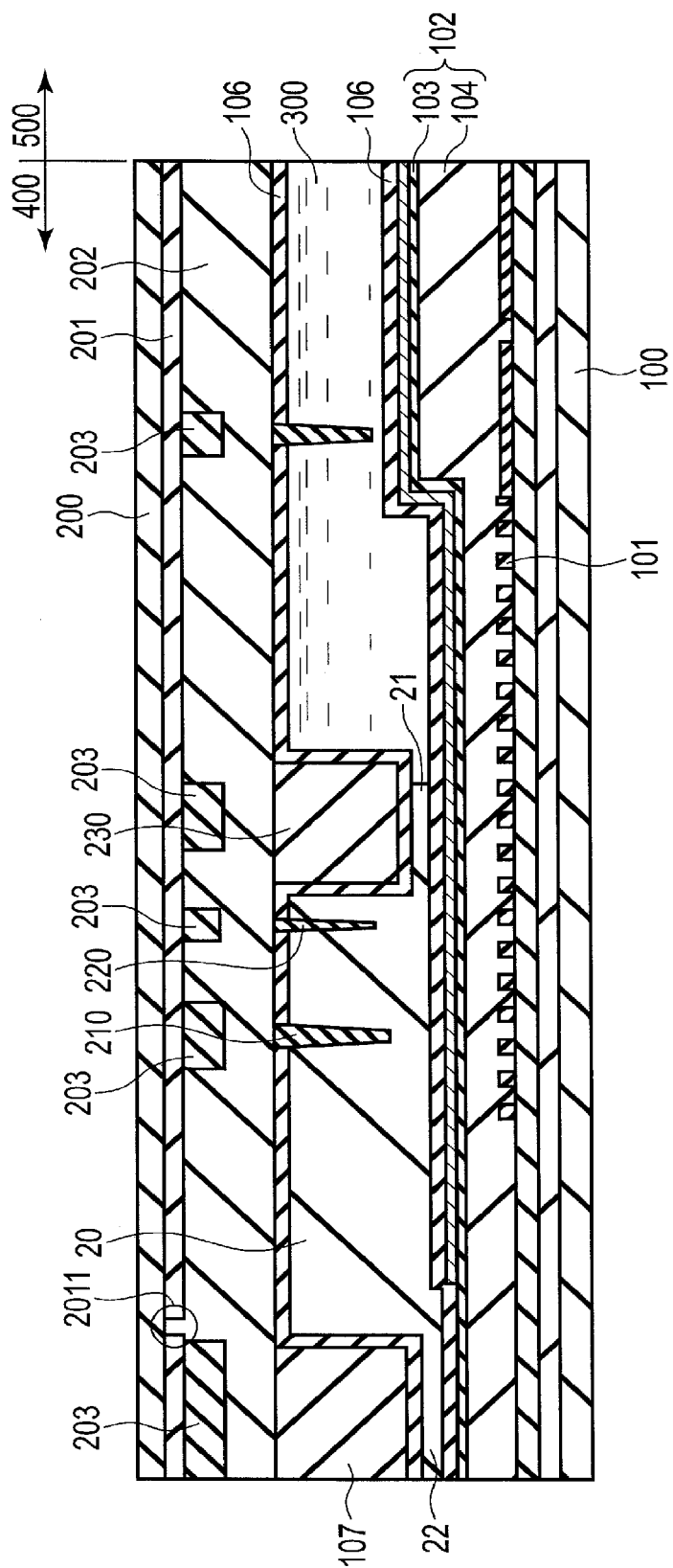
FIG. 6 is a cross-sectional view of a liquid crystal display device of a third embodiment which corresponds to the line A-A cross-section of FIG. 1.
Figure 9:
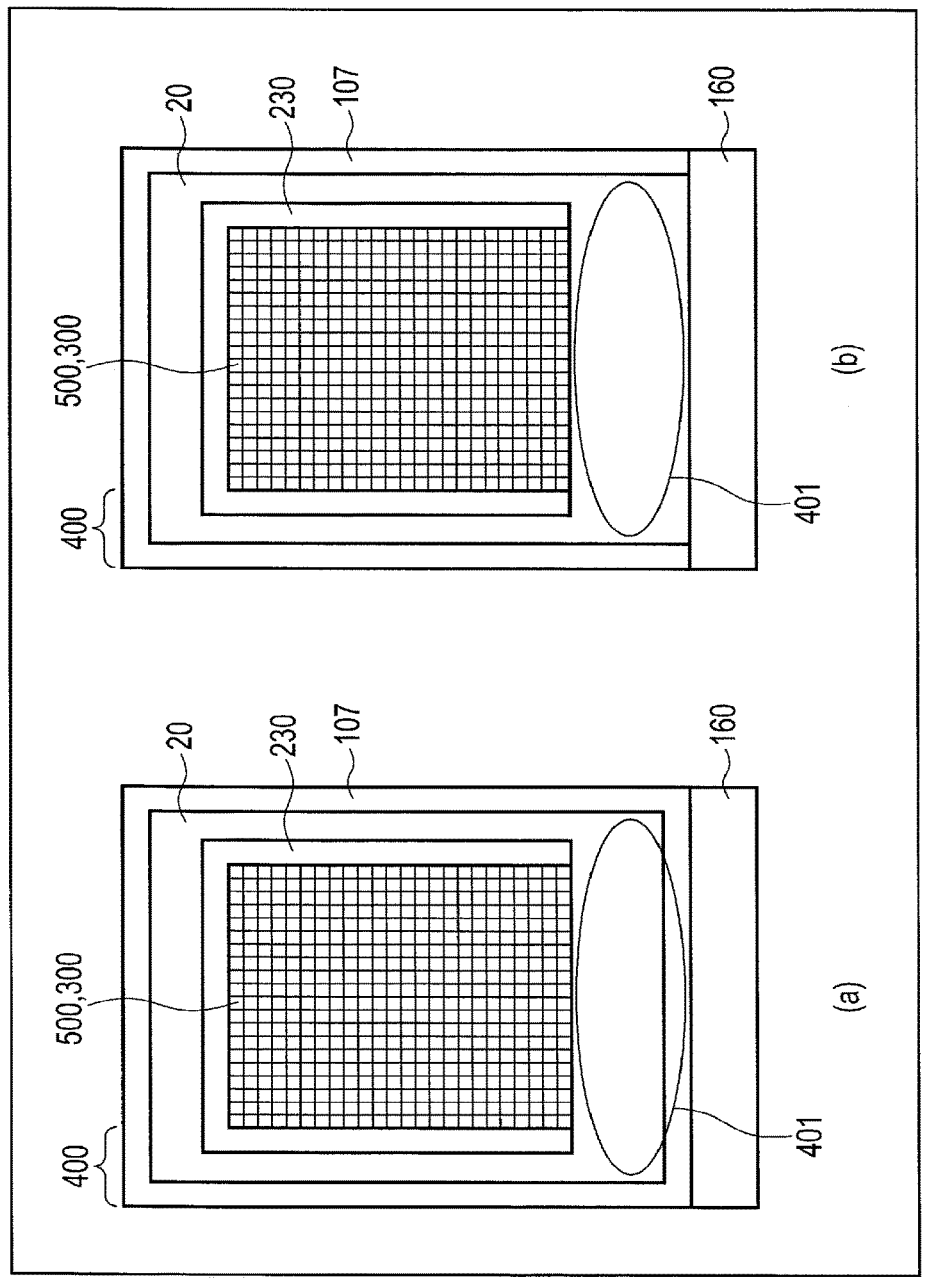
FIG. 9 is a plan view showing liquid crystal display devices of fifth and sixth embodiments.
Figure 10:
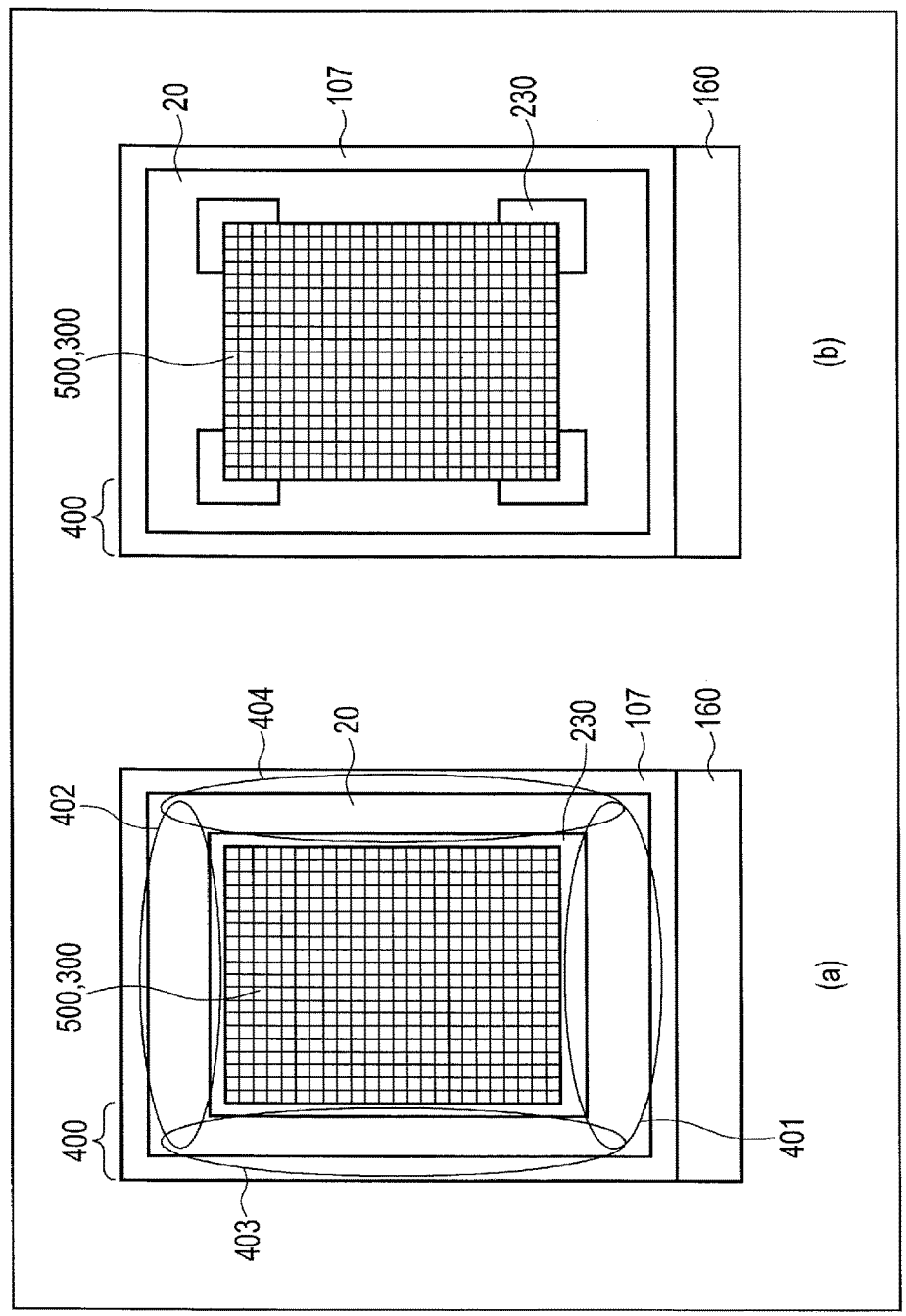
FIG. 10 is a plan view showing liquid crystal display devices of seventh and eighth embodiments.
Figure 11:
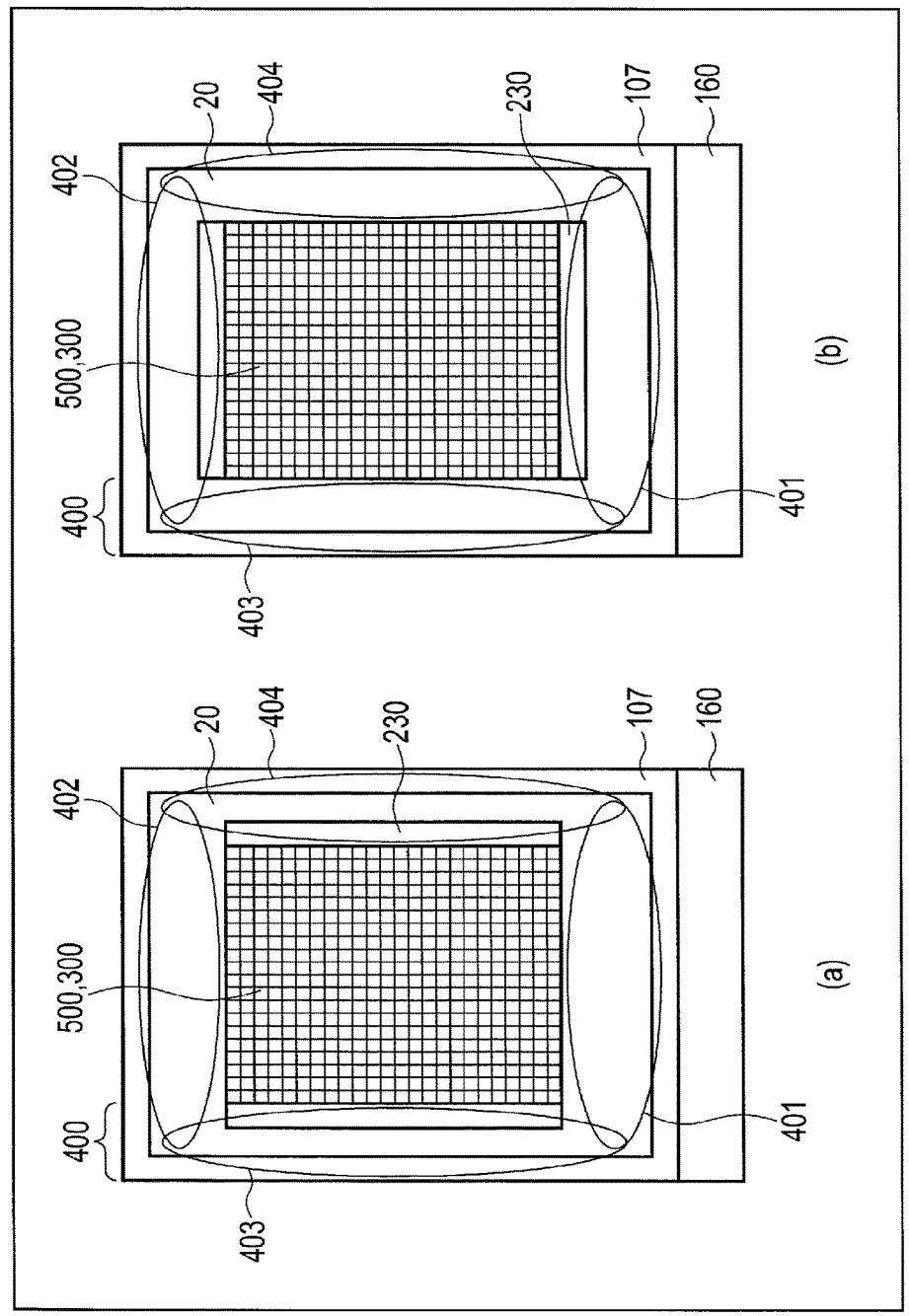
FIG. 11 is a plan view showing liquid crystal display devices of ninth and tenth embodiments.
Figure 12:
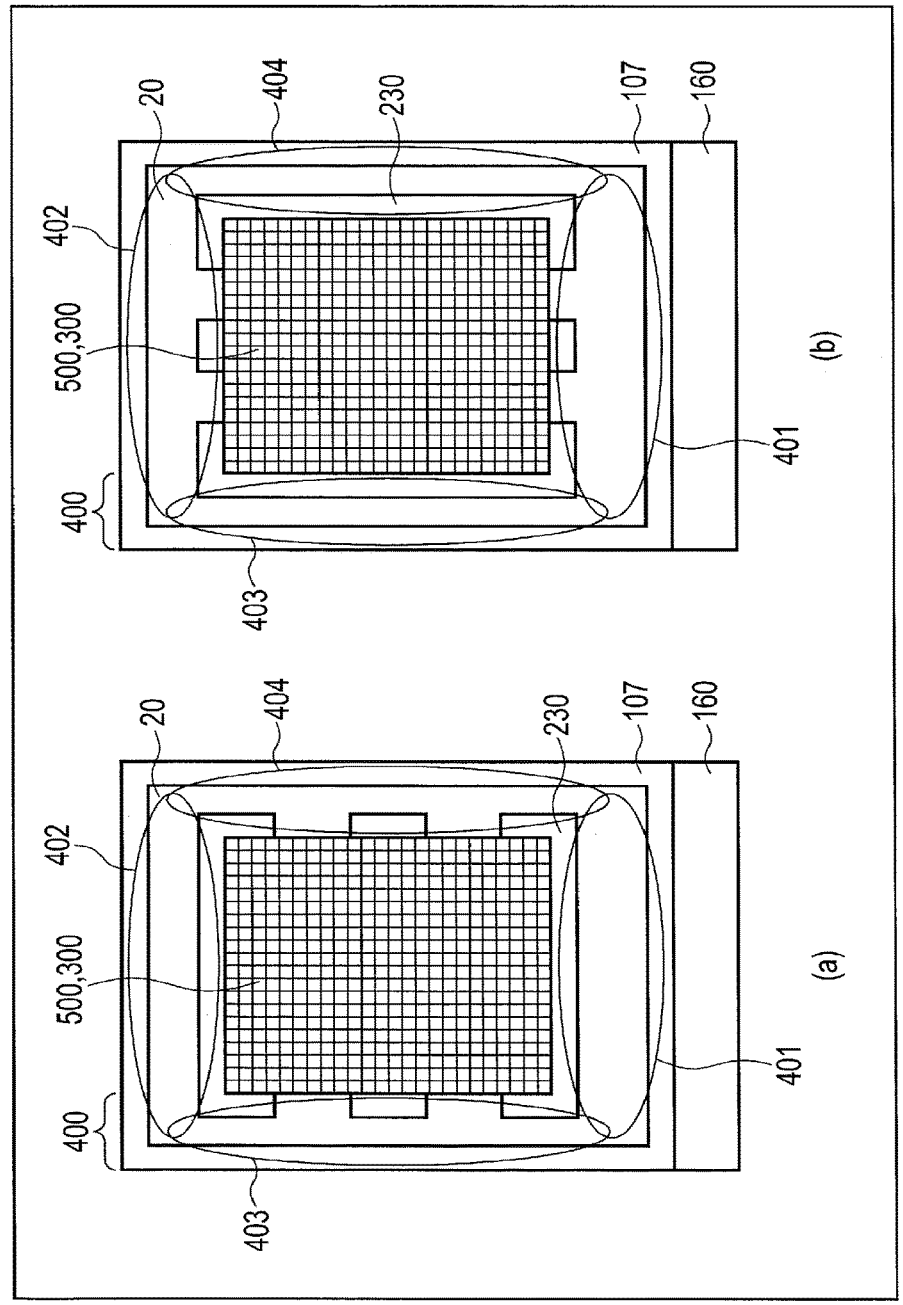
FIG. 12 is a plan view showing liquid crystal display devices of eleventh and twelfth embodiments.

FIG. 6 is a cross-sectional view showing a sealant 20 and a peripheral area 400 of the third embodiment, which corresponds to the line A-A cross-section of FIG. 1. The third embodiment will be explained in relation to the main commonality with and differences from the first embodiment.

In the example of FIG. 6, a first projection 230, third projection 107, first spacer 210, and second spacer 220, and an alignment film 106 extends in the seal area as in the first embodiment. The first projection 230 contacts liquid crystal 300 as in the first embodiment. The advantages achieved through the above structures are the same as in the first embodiment, and their detailed explanation is omitted.

On the other hand, the structure of the third embodiment differs from that of the first embodiment in the following respects. A second projection 232, fourth projection 108, fifth projection 109, and groove 110 are not formed. Furthermore, a first insulating layer 102 and a second insulating layer 202 in the seal area are not patterned to have a concave/convex pattern.

FIGS. 7 and 9 to 12 are plan views showing shapes and arrangements of a first projection 230 and a third projection 107 of a display device 600. FIG. 8 is a plan view showing a peripheral area 400. Hereinafter, fourth to twelfth embodiments with reference to FIGS. 7 to 12 in relation to the shapes and arrangements of the first projection 230 and the third projection 107. Note that, a third projection 107 is formed in the display device 600 of each of the fourth to twelfth embodiments; however, the third projection 107 is optional in each case.

(Fourth Embodiment)

FIG. 7 is a plan view of the fourth embodiment. A display device 600 is formed in a rectangular shape having four sides, and the proximity of one edge of a first substrate 100 is the aforementioned driver area 160. The display device 600 includes a display area 500 with liquid crystal 300 sealed in its center. Furthermore, the display device 600 includes a peripheral area 400 surrounding the display area 500, and a first projection 230 is formed in the peripheral area 400 to correspond to each of the four sides. Furthermore, a third projection 107 is formed in the peripheral area 400 to surround the first projection 230 and the display area 500. The first projection 230 contacts the liquid crystal 300 and the third projection 107 overlaps the sealant 20 in a plan view.

As shown in FIG. 8, if a display device if formed in a rectangular shape, the peripheral area 400 includes a first peripheral area 401, second peripheral area 402, third peripheral area 403, and fourth peripheral area 404, which correspond to the four sides of the display device 600, respectively. The first peripheral area 401 corresponds to the driver area 160 and the second peripheral area 402 is opposed to the first peripheral area 401. The third peripheral area 403 and the fourth peripheral area 404 are disposed between the first peripheral area 401 and the second peripheral area 402 and are opposed to each other. In each embodiment, the width W2 of a peripheral area in a direction crossing the direction of extension of the sealant 20 becomes greatest in the first peripheral area 401.

(Fifth Embodiment)

FIG. 9(a) is a plan view of the fifth embodiment. As compared to the fourth embodiment, a first projection 230 is not formed in a first peripheral area 401 in the fifth embodiment. Even in a thin-bezel display device, the first peripheral area 401 and a light shielding film 201 corresponding to the first peripheral area 401 are formed to be wide relative to the driver area 160.

With the above structure, even if liquid crystal 300 is contaminated by the sealant in the proximity of the first peripheral area 401, the contamination inside the display area 500 can be suppressed. Here, the first projection 230 reaches the inside of the sealant 20. If the first projection 230 extends in the sealant 20 to a greater extent, the volume of the sealant 20 decreases, and the strength of sealing may deteriorate. Furthermore, various interconnects are formed in the proximity of the first peripheral area 401 of the first substrate 100 and the first projection 230 may adversely effect such interconnects. Thus, in the fifth embodiment, the first projection 230 is omitted in the first peripheral area 401.

Note that, in the present embodiment, there are expressions indicating that a projection is not formed in a particular area. However, such expressions mean that a projection is partly omitted in a particular area, and they do not mean that there is no projection at all in the entirety of such a particular area.

(Sixth Embodiment)

FIG. 9(b) is a plan view of the sixth embodiment. As compared to the fourth embodiment, a first projection 230 and a third projection 107 are not formed in a first peripheral area 401. The first projection 230 is not formed for the same reason as in the fifth embodiment, and thus is not explained here.

As aforementioned, the first peripheral area 401 and a light shielding film 201 corresponding to the first peripheral area 401 are formed to be wide, and thus, moisture permeating the proximity of the first peripheral area 401 can be largely blocked to reach the display area 500. Furthermore, a third projection 107 formed in the first peripheral area 401 is not used in a scribing process of a motherboard. Thus, in consideration of the volume of the sealant 20 and its adverse effect to interconnects, a third projection 107 is not formed in the first peripheral area 401 in the sixth embodiment.

(Seventh Embodiment)

FIG. 10(a) is a plan view of the seventh embodiment. As compared to the fourth embodiment, a first projection 230 has a width which is less in second to fourth peripheral areas (402, 403, and 404) than the width in a first peripheral area 401 in the seventh embodiment. Note that the width of the first projection 230 is in the direction crossing the direction of extension of the sealant 20.

In a thin-bezel display device 600, the width of the first projection 230 may be not secured sufficiently. However, the above width relationship of the first projection 230 is adopted in consideration of each peripheral area and the relatively greater widths of the first peripheral area 401 and the light shielding film 201 corresponding to the first peripheral area 401.

(Eighth Embodiment)

FIG. 10(b) is a plan view of the eighth embodiment. As compared to the fourth embodiment, a first projection 230 is formed in a peripheral area 400 to correspond to the corners of the display area 500 and is not formed in the peripheral area 400 in the linear parts along the sides of the display area 500 in the eighth embodiment.

The adverse effect of contamination by the sealant mainly focuses on the corners of the display area 500, and thus, the first projections 230 are disposed in the corners. Furthermore, a second projection 232 is formed outside the linear parts along the sides of the display area 500 in a plan view.

(Ninth to Twelfth Embodiments)

FIG. 11(a) is a plan view of the ninth embodiment, FIG. 11(b) is a plan view of the tenth embodiment, FIG. 12(a) is a plan view of the eleventh embodiment, and FIG. 12(b) is a plan view of the twelfth embodiment. As compared to the fourth embodiment, the ninth to twelfth embodiments have the following differences.

A first projection 230 is not formed in a third peripheral area 403 or a fourth peripheral area 404 in the ninth embodiment. A first projection 230 is not formed in a first peripheral area 401 or a second peripheral area 402 in the tenth embodiment. A first projection 230 is not formed in a part of a third peripheral area 403 and the fourth peripheral area 404 in the eleventh embodiment. A first projection 230 is not formed in a part of a first peripheral area 401 and a second peripheral area 402 in the twelfth embodiment.

In order to determine a shape and arrangement of the first projection 230, several factors such as positions where liquid crystal 300 is easily contaminated, the volume of the sealant 20, the widths of peripheral areas, and interconnects formed in peripheral areas are considered. Thus, a suitable shape of the first projection 230 is determined on the basis of the characteristics of a final product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising: a first substrate; a second substrate; a display area on which an image is displayed; a peripheral area disposed outside the display area in a plan view; a sealant disposed in the peripheral area to adhere the first substrate and the second substrate; and liquid crystal sealed in between the first substrate and the second substrate by the sealant, the display device comprising:
   an alignment film formed on a surface of the first substrate or the second substrate to contact the liquid crystal; and
   a first projection formed on one of the first substrate and the second substrate and a first counterpart formed on the other of the first substrate and the second substrate, wherein
   the sealant has an outer edge and an inner edge in a width direction crossing a direction of extension thereof,
   the first projection extends in the direction of extension of the sealant,
   the first projection and the first counterpart are opposed to each other,
   a gap is formed between the first projection and the first counterpart to locate the sealant,
   the first projection and the gap have a first relationship in which the first projection has a vertical dimension greater than that of the gap,
   the first projection overlaps the liquid crystal and overlaps the inner edge in a plan view,
   the sealant surrounds seamlessly the liquid crystal,
   the sealant contacts the liquid crystal in the gap, and
   the gap extends in the direction of extension of the sealant while maintaining the first relationship.

2. The display device of claim 1, wherein the sealant does not include an injection port for the liquid crystal.

3. The display device of claim 1, wherein the alignment film contacts the sealant.

4. The display device of claim 1, further comprising a groove disposed outside the first projection in a plan view,
   wherein the groove extends in the direction of extension of the sealant, and
   wherein the sealant is received in the groove.

5. The display device of claim 1, further comprising a plurality of metal lines formed in the peripheral area of the first substrate, wherein
   the metal lines are formed in an area of the first substrate where the first substrate overlaps the first projection in a plan view,
   the metal lines are not formed in an area of the first substrate where the first substrate overlaps the groove in a plan view, and
   a gap between the metal lines or an opening pattern provided with the metal lines overlaps the area where the first substrate overlaps the first projection in a plan view.

6. The display device of claim 1, further comprising a third projection formed on the first substrate or the second substrate, wherein
   the third projection is formed on the substrate to be outside the first projection in a plan view, and
   the third projection overlaps the outer edge in a plan view.

7. The display device of claim 6, further comprising a fourth projection which is opposed to the third projection, wherein
   the third projection is formed on either the first substrate or the second substrate, and the fourth projection is formed on the other substrate,
   a gap is formed between the third projection and the fourth projection to locate the sealant, and
   an end of the first substrate, an end of the second substrate, an end of the third projection, and an end of the fourth projection are aligned straight in a cross-sectional view.

8. The display device of claim 6, further comprising a plurality of metal lines formed in the peripheral area of the first substrate, wherein
   the metal lines are formed in an area of the first substrate where the first substrate overlaps the first projection in a plan view,
   the metal lines are not formed in an area of the first substrate where the first substrate overlaps the third projection in a plan view, and
   a gap between the metal lines or an opening pattern provided with the metal lines overlaps the area where the first substrate overlaps the first projection in a plan view.

9. The display device of claim 1, wherein the peripheral area includes a first peripheral area and a second peripheral area which is different from the first peripheral area,
   the proximity of the end of the first substrate is a driver area,
   the first peripheral area corresponds to the driver area, and
   the first peripheral area does not include the first projection in a plan view.

10. The display device of claim 9, wherein
    the first projection has a width in a direction crossing the direction of extension of the sealant, and
    the width of the first projection in the second peripheral area is less than that in the first peripheral area.

11. The display device of claim 7, further comprising a plurality of metal lines formed in the peripheral area of the first substrate, wherein
    the metal lines are formed in an area of the first substrate where the first substrate overlaps the first projection in a plan view,
    the metal lines are not formed in an area of the first substrate where the first substrate overlaps the third projection in a plan view, and
    a gap between the metal lines or an opening pattern provided with the metal lines overlaps the area where the first substrate overlaps the first projection in a plan view.

12. The display device of claim 1, wherein a total length of the first projection and the first counterpart has a vertical dimension twice greater than the vertical dimension of the gap.

* * * * *